(12) United States Patent
Lin et al.

(10) Patent No.: US 12,434,454 B2
(45) Date of Patent: Oct. 7, 2025

(54) WATERPROOF AND MOISTURE-PERMEABLE COMPOSITE MATERIAL

(71) Applicant: SAN FANG CHEMICAL INDUSTRY CO., LTD., Kaohsiung (TW)

(72) Inventors: Chih-Yi Lin, Kaohsiung (TW); Kuo-Kuang Cheng, Kaohsiung (TW); Kao-Lung Yang, Kaohsiung (TW); Wei-Jie Liao, Kaohsiung (TW)

(73) Assignee: SAN FANG CHEMICAL INDUSTRY CO., LTD., Kaohsiung (TW)

( * ) Notice: Subject to any disclaimer, the term of this patent is extended or adjusted under 35 U.S.C. 154(b) by 426 days.

(21) Appl. No.: 17/877,650

(22) Filed: Jul. 29, 2022

(65) Prior Publication Data

US 2023/0071900 A1 Mar. 9, 2023

(30) Foreign Application Priority Data

Aug. 19, 2021 (TW) ................... 110130651

(51) Int. Cl.
*B32B 5/02* (2006.01)
*B32B 27/08* (2006.01)
*D04H 1/56* (2006.01)

(52) U.S. Cl.
CPC .............. *B32B 5/022* (2013.01); *B32B 27/08* (2013.01); *D04H 1/565* (2013.01);
(Continued)

(58) Field of Classification Search
CPC ............ B32B 2250/03; B32B 2250/40; B32B 2274/00; B32B 2307/726; B32B 5/022; B32B 27/322
(Continued)

(56) References Cited

U.S. PATENT DOCUMENTS 5,629,079 A * 5/1997 Battles ................ A61F 13/0269
442/151
2021/0316541 A1* 10/2021 Bachon ................... B32B 27/08

FOREIGN PATENT DOCUMENTS

JP    H08302554    * 11/1996

OTHER PUBLICATIONS

Pruitt, L A, Structural Biomedical Polymers, University of California, Berkely, CA Published 2011.*

* cited by examiner

*Primary Examiner* — Camie S Thompson
(74) *Attorney, Agent, or Firm* — MUNCY, GEISSLER, OLDS & LOWE, P.C.

(57) ABSTRACT

A waterproof and moisture-permeable composite material is provided, which is composed of a waterproof and moisture-permeable membrane and a melt-blown non-woven fabric. The melting point of melt-blown non-woven fabric ranges from 80° C. to 130° C., in which the melt-blown non-woven fabric is a thermoplastic polymer which may be a thermoplastic polyether ester elastomer polymer. A method for forming a waterproof and moisture-permeable composite material includes: providing a thermoplastic polymer; performing a melt-blown process to the thermoplastic polymer by using an extruder to form a melt-blown fiber, so the melt-blown fiber on a conveyer belt with multiple meshes to form a melt-blown non-woven fabric; covering a moisture-permeable membrane on the melt-blown non-woven fabric to adhere the moisture-permeable membrane and the melt-blown non-woven fabric to form a waterproof and moisture-permeable composite material.

3 Claims, 4 Drawing Sheets

(52) U.S. Cl.
CPC ....... *B32B 2250/03* (2013.01); *B32B 2250/24* (2013.01); *B32B 2250/40* (2013.01); *B32B 2274/00* (2013.01); *B32B 2305/20* (2013.01); *B32B 2307/726* (2013.01); *B32B 2367/00* (2013.01)

(58) Field of Classification Search
USPC ......................................................... 442/76
See application file for complete search history.

WATERPROOF AND MOISTURE-PERMEABLE COMPOSITE MATERIAL

CROSS-REFERENCE TO RELATED APPLICATIONS

This application claims the benefit of TW Patent Application No. 110130651, filed on Aug. 19, 2021, which is incorporated in its entirety by reference herein.

FIELD OF THE INVENTION

The present invention relates to the field of polymer materials, particularly relates to a waterproof and moisture-permeable composite material.

BACKGROUND OF THE INVENTION

A common waterproof and moisture-permeable membrane is representative of polytetrafluoroethylene (PTFE), olefin, polyester, and thermoplastic polyurethane (TPU) waterproof and moisture-permeable membrane. In current process, solvent or membrane adhesives are used to adhere aforesaid various kinds of waterproof and moisture-permeable membranes, in order to maintain self structure of the membranes, and to avoid affecting waterproof and moisture-permeable properties of the membranes due to suffer the outer force that destroy the structure of the membranes.

If the adhesion of the waterproof and moisture-permeable membrane is not good, for example, the solvent adhesives are used in the membrane process for PTFE (Polytetrafluoroethylene) material and olefin material to increase the adhesion, but the solvent will cause the environmental pollution problem and the poor process operation. If the material of the waterproof and moisture-permeable membrane is polyester or polyurethane, in addition to solvent gluing, the glued film are often used to thermally attach polyester waterproof and moisture-permeable membranes or polyurethane waterproof and moisture-permeable membranes. However, after lamination, the performance of the waterproof and moisture-permeable polyester membrane or polyurethane membrane may be greatly reduced due to the influence of the glued membrane.

SUMMARY OF THE INVENTION

According to the drawbacks of the conventional prior art, the main object of the present invention is to provide a waterproof and moisture-permeable composite material, which is well operable, solvent-free, which can be operated through the processing steps.

It is another object of the present invention, the waterproof and moisture-permeable composite material formed by processing steps has good waterproof and moisture-permeable properties, and because the material of the waterproof and moisture-permeable membrane is polyester that can be adhered to a thermoplastic polyether ester (TPEE) elastomer polymer as a melt-blown non-woven fabric. In addition, after the product life cycle, the waste recycling procedure is launched to achieve the effects of the polyester recycling and saving environmental energy saving.

According to the above objects, the present invention discloses a waterproof and moisture-permeable composite material, which is composed of a single-layer waterproof and moisture-permeable membrane and a melt-blown non-woven fabric. The melt-blown non-woven fabric can be the thermoplastic polymer, and the thermoplastic polymer can be thermoplastic polyether ester elastomer polymer.

According to the above objects, the present invention further discloses a multilayer waterproof and moisture-permeable composite material, which is composed of a first melt-blown non-woven fabric, a waterproof and moisture-permeable membrane and a second melt-blown non-woven fabric, in which the waterproof and moisture-permeable membrane is disposed between the first melt-blown non-woven fabric and the second melt-blown non-woven fabric.

DETAILED DESCRIPTION OF THE PREFERRED EMBODIMENT

Figure 1A:
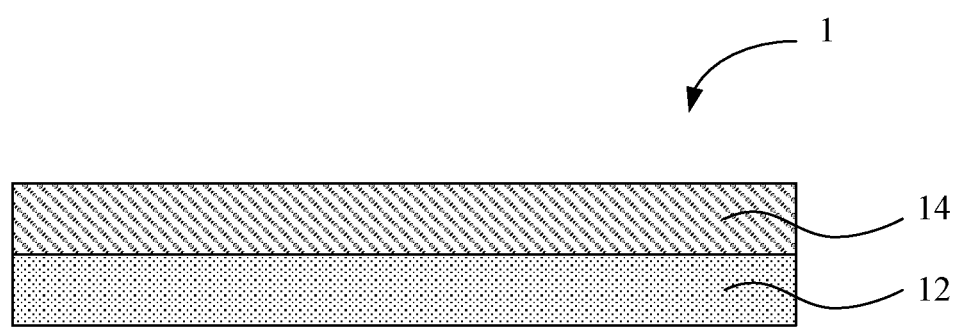
FIG. 1A is a sectional view of the waterproof and moisture-permeable composite material according to the techniques disclosed in the embodiment of the present invention.

At first, please refer to FIG. 1A. FIG. 1A shows a sectional view of the waterproof and moisture-permeable composite material of the present invention. As shown in FIG. 1A, the waterproof and moisture-permeable composite material 1 is composed of a melt-blown non-woven fabric 12 and a monolayer waterproof and moisture-permeable membrane 14. The average molecular weight (Mn) of polymer of the melt-blown non-woven fabric ranges from 20,000 to 35,000, the melting point ranges from 80° C. to 130° C., and melting viscosity ranges from 500 (dPa·s) to 6,500 (dPa·s). Meanwhile, the polymer is thermoplastic polymer, and thermoplastic polymer can be thermoplastic polyether ester elastomer (TPEE) polymer. In some embodiments of the present invention, the waterproof and moisture-permeable membrane 14 may be polytetrafluoroethylene (PTFE), olefin, polyester, or thermoplastic polyurethanes (TPU) waterproof and moisture-permeable membrane.

Figure 1B:
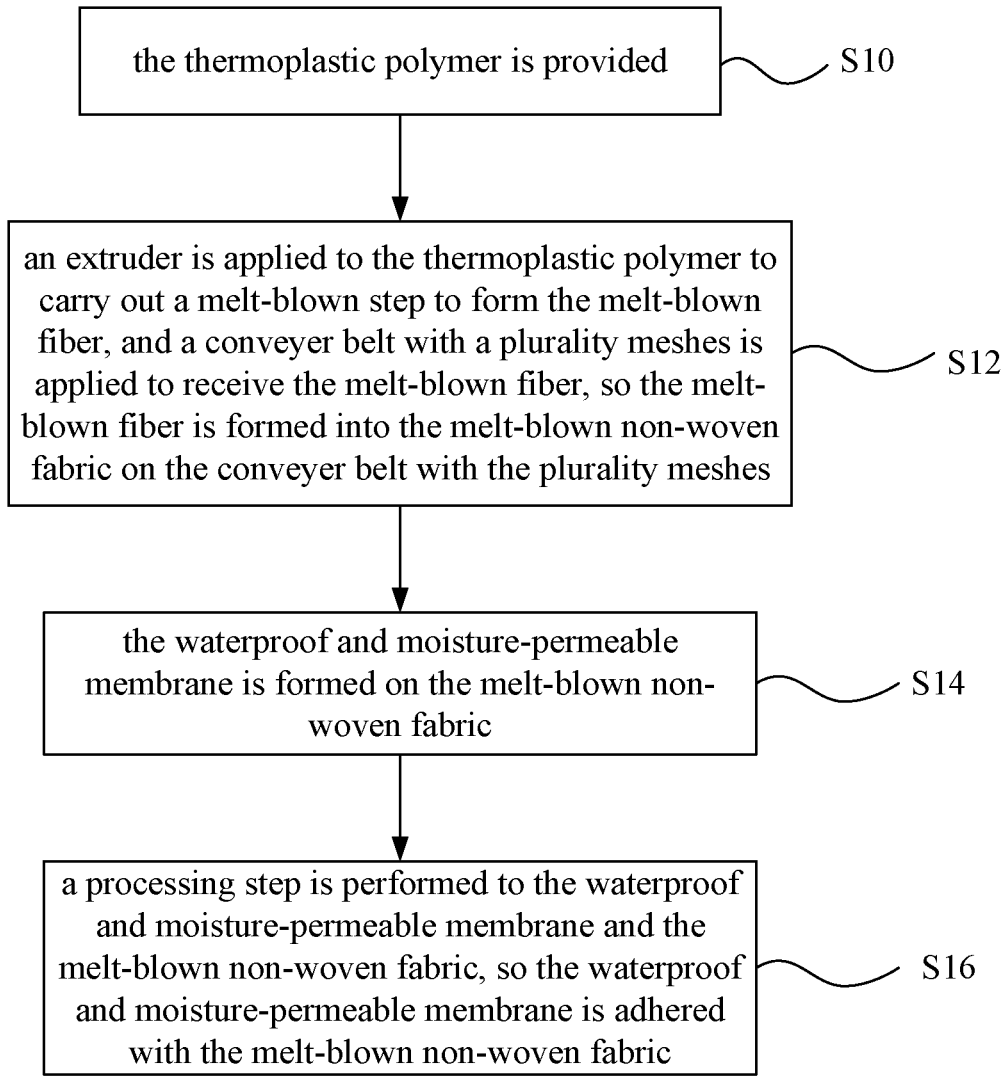
FIG. 1B is a schematic diagram of showing the steps of forming the waterproof and moisture-permeable composite material according to the techniques disclosed in the embodiment of the present invention.

Next, please refer to FIG. 1B. FIG. 1B is a schematic diagram of showing the steps of forming the waterproof and moisture-permeable composite material. As shown in FIG. 1B, step S10: the thermoplastic polymer is provided. In this step, the thermoplastic polymer is thermoplastic polyether ester elastomer, the average molecular weight (Mn) of thermoplastic polymer ranges from 20,000 to 35,000, the melting point ranges from 80° C. to 130° C., and the melting viscosity ranges from 500 (dPa·s) to 6,500 (dPa·s).

Next, step S12: an extruder is applied to the thermoplastic polymer to carry out a melt-blown step to form the melt-blown fiber, and a conveyer belt with a plurality meshes is applied to receive the melt-blown fiber, so the melt-blown fiber is formed into the melt-blown non-woven fabric on the conveyer belt with the plurality meshes. In this step, a melt-blown equipment (not shown) is applied, the thermoplastic polymer is then fed into the extruder (not shown) where is set to have multiple temperature sections between feed-end and discharge-end. Each temperature section ranges from 75° C. to 95° C., from 110° C. to 120° C., from 150° C. to 160° C. and from 180° C. to 195° C. in sequences. Therefore, after the thermoplastic polymer is formed into a molten state in the extruder (not shown), it is conveyed to a gear pump (not shown) with an operation speed range is 12 rpm to 15 rpm, and then it is conveyed to a melt-blown nozzle (not shown), in which the temperature range of the melt-blown nozzle is set at 210° C. to 230° C. Then, a hot air with a temperature range is 213° C. to 232° C. is used to blow the molten thermoplastic polymer at the discharge-end of the melt-blown nozzle (not shown) to form the melt-blown fiber.

Next, the cooling process is performed during the thermoplastic polymer is blown to form the melt-blown fiber, and the melt-blown fiber is conveyed to the conveyer belt (not shown) with the plurality of meshes to form the melt-blown non-woven fabric. In this embodiment, the operation speed of the conveyer belt with the plurality of meshes is set to be at 15 m/min to 25 m/min, so the melt-blown non-woven fabric with a basic weight of 15 to 60 g/m²±2 to 3 g/m² is formed. It should be noted that the basic weight of the melt-blown non-woven fabric should not be too heavy to avoid the overall melt-blown non-woven fabric has no air permeability and cannot achieve the purpose of waterproof and moisture permeability required by the present invention.

Next, step S14: the waterproof and moisture-permeable membrane is formed on the melt-blown non-woven fabric. In this step, a roll of the waterproof and moisture-permeable membrane with a thickness of 0.04±0.005 mm, and the waterproof and moisture-permeable membrane is then covered on the melt-blown non-woven fabric. The material of waterproof and moisture-permeable membrane may be the polytetrafluoroethylene (PTFE), olefin, thermoplastic polyurethanes (TPU) or polyester waterproof and moisture-permeable membrane. In one preferred embodiments of the present invention, the waterproof and moisture-permeable membrane is polyester waterproof and moisture-permeable membrane.

Next, step S16: a processing step is performed to the waterproof and moisture-permeable membrane and the melt-blown non-woven fabric, so the waterproof and moisture-permeable membrane is adhered with the melt-blown non-woven fabric. In this step, the processing step is performed with an infrared heating device (not shown) to heat the waterproof and moisture-permeable membrane and the melt-blown non-woven fabric, in which the heating temperature ranges from 85° C. to 115° C. In addition, the processing step is to use a heat-pressing roller (not shown) with a pressure range is 0.015 g/cm³ to 0.4 g/cm³ to press and adhere the waterproof and moisture-permeable membrane and the melt-blown non-woven fabric together to produce the waterproof and moisture-permeable composite material. It should be noted that during the processing step, the heating procedure and the pressurizing procedure may be carried out at the same time, or the heating procedure may be carried out first and then the pressurizing procedure, or the pressurizing procedure may be carried out first and then the heating procedure.

According to abovementioned step flow of FIG. 1B, the present invention provides the following specific embodiments.

Embodiment 1

A TPEE polymer with the average molecular weight (Mn) is 25,000, the melting point is 112° C., and the melting viscosity is 1,500 (dPa·s) which is prepared. The TPEE polymer is fed into the extruder (not shown), the temperatures of the extruder from the feed-end to the discharge-end are set at 80° C., 110° C., 150° C., and 180° C. in sequences. After the TPEE polymer is formed into the molten state in the extruder, the TPEE polymer with the molten state is pushed into the gear pump (not shown) with an operation speed of 15 rpm. Then, the molten TPEE polymer is conveyed to the melt-blown nozzle (not shown), in which the temperature of the melt-blown nozzle is set at 220° C. Next, the temperature of a hot air is set at 225° C. which is used to blow the molten TPEE polymer at the discharge-end of the melt-blown nozzle to form the melt-blown fiber. Then, the cooling process is performed during the melt-blown fiber is blown, and the conveyer belt (not shown) with the plurality of meshes, especially in track-type conveyer belt, is applied to receive the blown melt-blown fiber with an operation speed of 15 m/min. Accordingly, the melt-blown TPEE non-woven fabric with a basic weight of 60±3 g/m² is formed on the conveyer belt with plurality of meshes.

Next, a roll of the polyester waterproof and moisture-permeable membrane with a thickness of 0.04±0.005 mm is unfolded, and the polyester waterproof and moisture-permeable membrane is then covered on the melt-blown TPEE non-woven fabric. Next, the infrared heating device (not shown) is applied again to preheat the polyester waterproof and moisture-permeable membrane and the melt-blown TPEE non-woven fabric at the preheating temperature is set at 95° C. In addition, the heat-pressing roller (not shown) with a pressure of 0.03 kg/cm³ is applied to press and adhere the polyester waterproof and moisture-permeable membrane and the melt-blown TPEE non-woven fabric together to produce the polyester waterproof and moisture-permeable composite material.

Embodiment 2

A TPEE polymer with average molecular weight (Mn) is 35,000, the melting point is 126° C., and the melting viscosity is 6,500 (dPa·s) which is prepared. The TPEE polymer is fed into the extruder (not shown) and the temperatures of the extruder from the feed-end to the discharge-end are set at 95° C., 120° C., 160° C. and 195° C. in sequences. After the TPEE polymer is formed into the molten state in the extruder, the TPEE polymer with the molten state is conveyed to the gear pump (not shown) with an operation speed of 15 rpm. Then, the molten TPEE polymer is push into the melt-blown nozzle (not shown), and the temperature of the melt-blown nozzle is set at 230° C. Next, the temperature of a hot air is set at 232° C. which is used to blow the molten TPEE polymer at the discharge-end of the melt-blown nozzle to form the melt-blown fiber. Then, the cooling process is performed during the melt-blown fiber is blown, and the conveyer belt (not shown) with the plurality of meshes, especially in track-type conveyer belt, is applied to receive the blown melt-blown fiber with an operation speed of 25 m/min. Accordingly, the melt-blown TPEE non-woven fabric with a base weight of 15±2 g/m² is formed on the conveyer belt with the plurality of meshes.

Next, a roll of the polyester waterproof and moisture-permeable membrane with a thickness of 0.04±0.005 mm is unfolded. Then, the polyester waterproof and moisture-permeable membrane is covered on the melt-blown TPEE non-woven fabric. Next, the infrared heating device (not shown) is applied to preheat the polyester waterproof and moisture-permeable membrane and the melt-blown TPEE non-woven fabric at the preheating temperature is set at 115°

C. In addition, the heat-pressing roller (not shown) with a pressure of 0.015 kg/cm³ is applied to press and adhere the polyester waterproof and moisture-permeable membrane and the melt-blown TPEE non-woven fabric together to produce the polyester waterproof and moisture-permeable composite material.

Embodiment 3

A TPEE polymer with the average molecular weight (Mn) is 30,000, the melting point is 96° C., and the melting viscosity is 500 (dPa·s) which is prepared. The TPEE polymer is fed into the extruder (not shown), and the temperatures of the extruder from the feed end to the discharge-end are set at 75° C., 115° C., 150° C. and 185° C. in sequences. After the TPEE polymer is formed into the molten state in the extruder, the TPEE polymer with the molten state is push into the gear pump (not shown) with an operation speed of 12 rpm. Then, the molten TPEE polymer is conveyed to the melt-blown nozzle (not shown), in which the temperature of the melt-blown nozzle is set at 210° C. Next, the temperature of a hot air is set at 213° C. which is used to blow the molten TPEE polymer at the discharge-end of the melt-blown nozzle to form the melt-blown fiber. Then, the cooling process is performed during the melt-blown fiber is blown, and the conveyer belt (not shown) with a plurality of meshes, especially in track-type conveyer belt, is applied to receive the blown melt-blown fiber with an operation speed of 18 m/min. In consequence, the melt-blown TPEE non-woven fabric with a basic weight of 30±2 g/m² is formed on the conveyer belt with the plurality of meshes.

Next, a roll of the polyester waterproof and moisture-permeable membrane with a thickness of 0.04±0.005 mm is unfolded. Then, the polyester waterproof and moisture-permeable membrane is covered on the melt-blown TPEE non-woven fabric. Next, the infrared heating device (not shown) is applied to preheat the polyester waterproof and moisture-permeable membrane and the melt-blown TPEE non-woven fabric at the preheating temperature is set at 85° C. In addition, the heat-pressing roller (not shown) with a pressure of 0.02 kg/cm³ is applied to press and adhere the polyester waterproof and moisture-permeable membrane and the melt-blown TPEE non-woven fabric together to produce the polyester waterproof and moisture-permeable composite material.

Figure 2A:
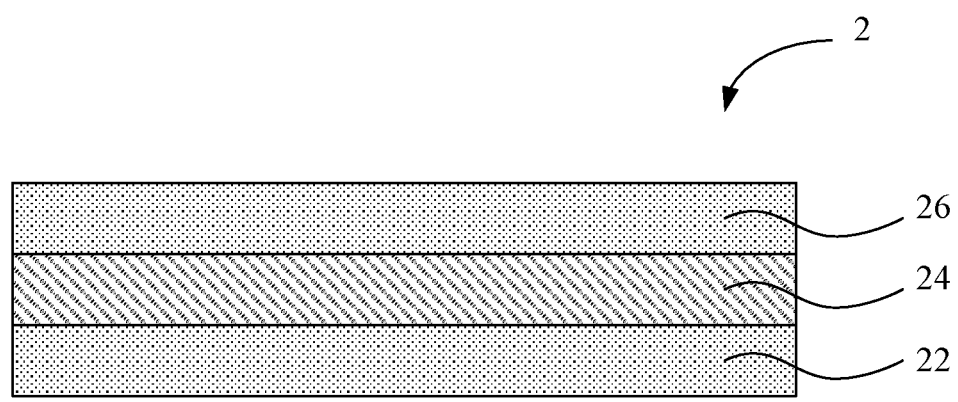
FIG. 2A is a sectional view of the multilayer waterproof and moisture-permeable composite material according to the techniques disclosed in the embodiment of the present invention.

Next, please refer to FIG. 2A. FIG. 2A is a sectional view of the multilayer waterproof and moisture-permeable composite material. As shown in FIG. 2A, the waterproof and moisture-permeable composite material 2 is composed of a first melt-blown non-woven fabric 22, the waterproof and moisture-permeable membrane 24 and the second melt-blown non-woven fabric 26. The waterproof and moisture-permeable membrane 24 is disposed between the first melt-blown non-woven fabric 22 and the second melt-blown non-woven fabric 26. The material properties of the first melt-blown non-woven fabric 22 are the same as the above melt-blown non-woven fabric in FIG. 1A, the average molecular weight (Mn) ranges from 20,000 to 35,000, the melting point ranges from 80° C. to 130° C., and the melting viscosity ranges from 500 (dPa·s) to 6,500 (dPa·s). In addition, the average molecular weight (Mn) of the second melt-blown non-woven fabric 26 ranges from 20,000 to 30,000, the melting point ranging from 70° C. to 125° C., and the melting viscosity ranging from 500 (dPa·s) to 5,500 (dPa·s). In this embodiment, the first melt-blown non-woven fabric 22 and the second melt-blown non-woven fabric 26 can be respectively the thermoplastic polymer which may be thermoplastic polyether ester elastomer (TPEE) polymer. The waterproof and moisture-permeable membrane 24 may be the polytetrafluoroethylene (PTFE), olefin, polyester, or thermoplastic polyurethanes (TPU) waterproof and moisture-permeable membrane.

Figure 2B:
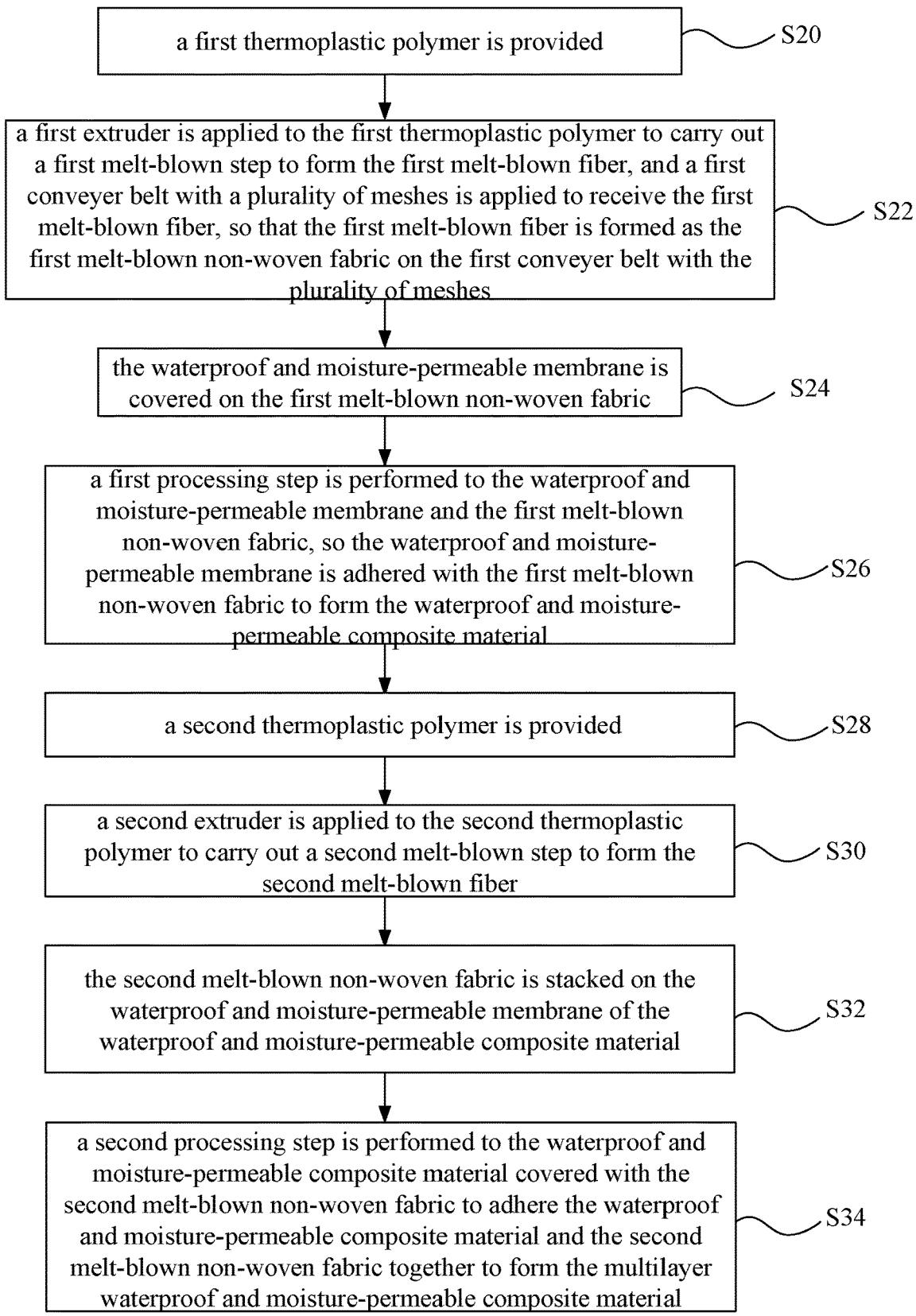
FIG. 2B is a schematic diagram of showing the steps of forming the multilayer waterproof and moisture-permeable composite material according to the techniques disclosed in the embodiment of the present invention.

Next, please refer to FIG. 2B. FIG. 2B is a schematic of showing the steps of forming the multilayer waterproof and moisture-permeable composite material. As shown in FIG. 2B, step S20 and step S22 are performed to form the first melt-blown non-woven fabric. In step S20: a first thermoplastic polymer is provided. In this step, the average molecular weight (Mn) of the first thermoplastic polymer ranges from 20,000 to 35,000, the melting point ranges from 80° C. to 130° C., and the melting viscosity ranges from 500 (dPa·s) to 6,500 (dPa·s). Next, step S22: a first extruder is applied to the first thermoplastic polymer to carry out a first melt-blown step to form the first melt-blown fiber, and a first conveyer belt with a plurality of meshes is applied to receive the first melt-blown fiber, so that the first melt-blown fiber is formed as the first melt-blown non-woven fabric on the first conveyer belt with the plurality of meshes. Herein, the procedures in step S22 are the same as those in step S12, the detail is not repeatedly illustrated.

Next, step S24: the waterproof and moisture-permeable membrane is covered on the first melt-blown non-woven fabric. In this step, a roll of the waterproof and moisture-permeable membrane with a thickness of 0.04±0.005 mm is previously unfolded. Then, the waterproof and moisture-permeable membrane is covered on the first melt-blown non-woven fabric. In the embodiment of the present invention, the waterproof and moisture-permeable membrane may be the polytetrafluoroethylene (PTFE), olefin, thermoplastic polyurethanes (TPU) or polyester waterproof and moisture-permeable membrane.

Next, step S26: a first processing step is performed to the waterproof and moisture-permeable membrane and the first melt-blown non-woven fabric, so the waterproof and moisture-permeable membrane is adhered with the first melt-blown non-woven fabric to form the waterproof and moisture-permeable composite material. In this step, the first processing step is performed with an infrared heating device (not shown) to preheat the waterproof and moisture-permeable membrane and the first melt-blown non-woven fabric at the preheating temperature ranging from 85° C. to 115° C. In addition, the first processing step is also performed with a heat-pressing roller (not shown) with a pressure which ranges from 0.015 g/cm³ to 0.4 g/cm³ to press and adhere the waterproof and moisture-permeable membrane and the first melt-blown non-woven fabric together to produce the waterproof and moisture-permeable composite material. The waterproof and moisture-permeable composite material produced at this step is called semi-product. It is noted that during the first processing step, the heating procedure and the pressing procedure may be performed simultaneously. Alternatively, the heating procedure may be performed at first and then the pressing procedure may be performed, or probably the pressing procedure may be performed at first and then the heating procedure may be performed.

Next, step S28 to step S32 are performed to form the second melt-blown non-woven fabric. In step S28: a second thermoplastic polymer is provided. In this step, the second thermoplastic polymer is TPEE polymer, and the second average molecular weight (Mn) of the second thermoplastic polymer ranges from 20,000 to 30,000, the second melting point ranges from 70° C. to 125° C., and the second melting viscosity ranging from 500 (dPa·s) to 5,500 (dPa·s). Next, step S30: a second extruder is applied to the second thermoplastic polymer to carry out a second melt-blown step to form the second melt-blown fiber. In addition, a second conveyer belt includes a plurality of meshes which is applied to receive the second melt-blown fiber, so that the second melt-blown fiber is formed as the second melt-blown non-woven fabric on the second conveyer belt with the plurality of meshes. In this step, the melt-blown equipment (not shown) is applied, and the second thermoplastic polymer is fed into the second extruder (not shown) where is set to has multiple temperature sections between feed end and discharge end. Each temperature section is respectively set at 80° C., 110° C., 150° C. and 180° C. in sequences. Therefore, after the second thermoplastic polymer is formed into the molten state in the second extruder (not shown), it is push into the gear pump (not shown) with an operation speed of 12 rpm, and then it is conveyed to the melt-blown nozzle (not shown), in which the temperature of the melt-blown nozzle is set at 220° C. Then, a hot air with the temperature at 225° C. is used to blow the molten second thermoplastic polymer at the discharge-end of the melt-blown nozzle (not shown) to form the second melt-blown fiber. Next, during the second thermoplastic polymer is blown to form the second melt-blown fiber, a cooling process is performed. Then, the second melt-blown fiber is conveyed to the second conveyer belt (not shown) with the plurality of meshes to form the second melt-blown non-woven fabric.

Step S32: the second melt-blown non-woven fabric is stacked on the waterproof and moisture-permeable membrane of the waterproof and moisture-permeable composite material. In this step, the second melt-blown non-woven fabric obtained from aforesaid step S30 on the waterproof and moisture-permeable composite material obtained from aforesaid step S26. It mainly noted that the second melt-blown non-woven fabric is covered on the side at the waterproof and moisture-permeable membrane of the waterproof and moisture-permeable composite material. In some embodiments of the present invention, the waterproof and moisture-permeable membrane may be the polytetrafluoroethylene (PTFE), olefin, thermoplastic polyurethanes (TPU), or polyester waterproof and moisture-permeable membrane.

Next, step S34: a second processing step is performed to the waterproof and moisture-permeable composite material covered with the second melt-blown non-woven fabric to adhere the waterproof and moisture-permeable composite material and the second melt-blown non-woven fabric together to form the multilayer waterproof and moisture-permeable composite material. In this step, the second processing step is performed with the infrared heating device (not shown) to heat the semi-finished product which is the waterproof and moisture-permeable membrane composite material and the melt-blown non-woven fabric. The preheating temperature of the infrared heating device ranges from 85° C. to 115° C. In addition, the second processing step is performed with a heat-pressing roller (not shown) with a pressure range is 0.015 g/cm$^3$ to 0.4 g/cm$^3$ to press and adhere the waterproof and moisture-permeable composite material and the second melt-blown non-woven fabric together to produce the multilayer waterproof and moisture-permeable composite material. It is noted that during the second processing step, the heating procedure and the pressing procedure may be performed simultaneously. Alternatively, the heating procedure may be performed at first and then the pressing procedure may be performed, or probably the pressing procedure may be performed at first and then the heating procedure may be performed.

According to abovementioned step flow of FIG. 2B, the present invention provides the following embodiment 4

Embodiment 4

A TPEE polymer with the average molecular weight (Mn) is 30,000, the melting point is 96° C., and the melting viscosity is 500 (dPa·s) which is prepared. The TPEE polymer is fed into the extruder (not shown) in which the temperatures from the feed end to the discharge end are set at 75° C., 115° C., 150° C. and 185° C. in sequences. After the TPEE polymer is formed into the molten state in the extruder, the TPEE polymer with the molten state is push into the gear pump (not shown) with the operation speed of 18 rpm. Then the molten TPEE polymer is conveyed to the melt-blown nozzle (not shown), in which the temperature of the melt-blown nozzle is set at 212° C. Next, the temperature of a hot air set at 215° C. is used to blow the molten TPEE polymer at the discharge-end of the melt-blown nozzle to form the melt-blown fiber. Then cooling process is performed during the melt-blown fiber is blown, and the conveyer belt (not shown) with a plurality of meshes, especially in track-type conveyer belt, is applied to receive the blown melt-blown fiber with an operation speed of 12 m/min. In consequence, the melt-blown TPEE non-woven fabric with a basic weight of 30±2 g/m$^2$ is formed on the conveyer belt with the plurality of meshes.

Next, a roll of the polyester waterproof and moisture-permeable membrane with a thickness of 0.035±0.005 mm is unfolded. Then, the polyester waterproof and moisture-permeable membrane is covered on the melt-blown TPEE non-woven fabric. Next, the infrared heating device (not shown) is applied to preheat the polyester waterproof and moisture-permeable membrane and the preheating temperature of the melt-blown TPEE non-woven fabric is set at 85° C. In addition, the heat-pressing roller (not shown) with a pressure of 0.05 kg/cm$^3$ is applied to adhere the polyester waterproof and moisture-permeable membrane and the melt-blown TPEE non-woven fabric together through the processing step. Then, by winding the polyester waterproof and moisture-permeable composite material is finished, which is served as the semi-product.

Next, another TPEE polymer with the average molecular weight is 25,000, the melting point is 112° C., and the melting viscosity is 1500 (dPa·s) which is prepared. The TPEE polymer is fed into the extruder (not shown), and the temperatures of extruder from the feed-end to the discharge-end are set at 80° C., 110° C., 150° C. and 180° C. in sequences. After the TPEE polymer is formed into the molten state in the extruder, the TPEE polymer with the molten state is push into the gear pump (not shown) with an operation speed of 12 rpm. Then, the molten TPEE polymer is conveyed to the melt-blown nozzle (not shown), and the temperature of the melt-blown nozzle is set at 220° C. Next, the temperature of a hot air set at 225° C. is used to blow the molten TPEE polymer at the discharge-end of the melt-blown nozzle to form the melt-blown fiber. Then, a cooling process is performed during the melt-blown fiber is blown, and the conveyer belt (not shown) with a plurality of meshes, especially in track-type conveyer belt, is applied to receive the blown melt-blown fiber with an operation speed of 16 m/min of the speed. Accordingly, the melt-blown TPEE non-woven fabric with a basic weight of 30±2 g/m$^2$ is formed on the conveyer belt with the plurality of meshes.

Next, the aforesaid semi-finished product, the polyester waterproof and moisture-permeable composite material, and the melt-blown TPEE non-woven fabric are unrolled together, so that the melt-blown TPEE non-woven fabric is laminated to the semi-finished product polyester waterproof and moisture-permeable composite material, and the melt-blown TPEE non-woven fabric is stacked on the side of the waterproof and moisture-permeable membrane of the polyester waterproof and moisture-permeable composite material. Next, the another processing step is performed, the semi-finished product (polyester waterproof and moisture-permeable composite material) and the melt-blown TPEE non-woven fabric are adhered together by using the heating procedure and the pressurizing procedure in the processing step to complete multilayer waterproof and moisture-permeable composite material whose the upper and bottom layer of multilayer waterproof and moisture-permeable composite material is the melt-blown TPEE non-woven fabric and the middle layer is polyester waterproof and moisture-permeable composite material. In above, the heating procedure is performed with an infrared heating device and the pressurizing procedure is performed with a heat-pressing roller (not shown) with a pressure of 0.04 kg/cm$^3$.

In addition, the present invention also provides comparative example 1 and comparative example 2, which are used to compare the physical properties and the moisture permeability with abovementioned embodiment 1 to embodiment 4, in which the formation steps of comparative example 1 and comparative example 2 are respectively illustrated as follows.

Comparative Example 1

A TPU membrane with a thickness is 0.025±0.005 mm and the melting point is 102° C., and the polyester waterproof and moisture-permeable membrane with the thickness is 0.04±0.005 mm which is prepared. The TPU membrane is bottom layer, and the polyester waterproof and moisture-permeable membrane is upper layer to complete lamination by using a laminator (not shown) to adhere the TPU membrane and the polyester waterproof and moisture-permeable membrane to produce a sample of Comparative Example 1. The upper temperature of the heater (not shown) of the laminator is set at 110° C. and the bottom temperature of the heater (not shown) of the laminator is set at 90° C., the laminating pressure is 2 kg/cm$^2$, and the laminating time is 20 seconds.

Comparative Example 2

A TPEE polymer with the average molecular weight is 30,000, the melting point is 96° C., and the melting viscosity is 500 (dPa·s) which is prepared. A T-die cast film extrusion machine (not shown) is applied to feed the TPEE polymer into the extruder (not shown) and the temperatures of T-die cast film extrusion machine from the feed-end to the discharge-end are set at 75° C., 115° C., 150° C. and 185° C. in sequences. After the TPEE polymer is formed into the molten state in the extruder, the TPEE polymer with the molten state is push into the gear pump (not shown) with operation speed of 8 rpm. Then, the molten TPEE polymer is conveyed to a T-die head body (not shown), and the temperature of the T-die head body is set at 200° C. After being extruded into a membrane, the polyester membrane is contacted with a chilling roller (not shown) with a surface temperature is 35° C. and a linear speed of 22 m/min to cool the polyester membrane to obtain the polyester membrane with a thickness of 0.025±0.005 mm.

Next, the polyester membrane and the polyester waterproof and moisture-permeable membrane with a thickness of 0.04±0.005 mm are stacked, and the polyester membrane is disposed on the bottom, and the polyester waterproof and moisture-permeable membrane is disposed on the upper. The laminator is applied to laminate the polyester membrane and the polyester waterproof and moisture-permeable membrane to complete the sample of Comparative Example 2. The upper temperature of the heater (not shown) of the laminator is set at 130° C. and the bottom temperature of the heater (not shown) of the laminator is set at 90° C., the laminating pressure is 3 kg/cm$^2$, and a laminating time is 30 seconds.

The samples of the aforesaid Embodiment 1 to Embodiment 4 and Comparative Examples 1 and 2 are respectively tested for physical properties and moisture permeability, the result data is listed in Table 1.

TABLE 1

| | Embodiment 1 | Embodiment 2 | Embodiment 3 | Embodiment 4 | Comparative Example 1 | Comparative Example 2 | Test method |
|---|---|---|---|---|---|---|---|
| thickness (μm) | 108 | 61 | 76 | 101 | 69 | 67 | ASTM D-1777 |
| tensile stress (Kgf) | 3.67 | 2.26 | 2.94 | 3.38 | 8.62 | 9.77 | ASTM D-412 |
| elongation at break (%) | 242 | 197 | 221 | 239 | 473 | 424 | ASTM D-412 |
| Moisture permeability (g/m$^2$-24 hrs) | 2402 | 2677 | 2511 | 2396 | 217 | 197 | ASTM E96-00, BW 23° C., 50% R.H |

In Table 1, it can be seen from Comparative Examples 1 and 2, as long as the waterproof and moisture-permeable membrane is used to adhere the membrane, the moisture permeability will be decreased. From Embodiment 1 to Embodiment 4, it can be seen that the moisture permeability of the waterproof and moisture-permeable membrane does not change much. Even if the basic weight of the melt-blown polyester non-woven fabric is different, there is no influence on the moisture permeability. Since the melt-blown TPEE non-woven fabric is good at moisture permeable effect, the moisture permeability of the melt-blown TPEE non-woven fabric and the waterproof and moisture-permeable membrane will not be affected after laminated to the waterproof and moisture-permeable membrane.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A multilayer waterproof and moisture-permeable composite material, composed of a first melt-blown non-woven fabric, a waterproof and moisture-permeable membrane and a second melt-blown non-woven fabric, wherein the waterproof and moisture-permeable membrane is disposed between the first melt-blown non-woven fabric and the second melt-blown non-woven fabric; the first melt-blown non-woven fabric and the second melt-blown non-woven fabric are thermoplastic polymer; the thermoplastic polymer is TPEE polymer, and wherein a first average molecular weight (Mn) of the first melt-blown non-woven fabric ranges from 20,000 to 35,000, and a second average molecular weight (Mn) of the second melt-blown non-woven fabric ranges from 20,000 to 30,000.

2. The waterproof and moisture-permeable composite material of claim 1, wherein the waterproof and moisture-permeable membrane is polytetrafluoroethylene (PTFE), olefin, polyester or thermoplastic polyurethanes (TPU) waterproof and moisture-permeable membrane.

3. A multilayer waterproof and moisture-permeable composite material, composed of a first melt-blown non-woven fabric, a waterproof and moisture-permeable membrane and a second melt-blown non-woven fabric, wherein the waterproof and moisture-permeable membrane is disposed between the first melt-blown non-woven fabric and the second melt-blown non-woven fabric; the first melt-blown non-woven fabric and the second melt-blown non-woven fabric are thermoplastic polymer; the thermoplastic polymer is TPEE polymer, wherein a first melting point of the first melt-blown non-woven fabric ranges from 80° C. to 130° C., and a first melting viscosity ranges from 500 (dPa·s) to 6,500 (dPa·s), a second melting point of the second melt-blown non-woven fabric ranges from 70° C. to 125° C., and a second melting viscosity ranges from 500 (dPa·s) to 5,500 (dPa·s).

* * * * *